(12) United States Patent
Liang et al.

(10) Patent No.: US 12,005,652 B2
(45) Date of Patent: Jun. 11, 2024

(54) DEVICE FOR MANUFACTURING STORAGE CONTAINER BY INTEGRALLY WINDING MULTIPLE BUNDLES OF FIBERS IN DOUBLE-LAYER SPIRAL CIRCUMFERENTIAL DIRECTION

(71) Applicant: Taiyuan University of Technology, Taiyuan (CN)

(72) Inventors: Jianguo Liang, Taiyuan (CN); Qingxue Huang, Taiyuan (CN); Yujie Duan, Taiyuan (CN); Yinhui Li, Taiyuan (CN); Chunjiang Zhao, Taiyuan (CN); Jun Feng, Taiyuan (CN); Liping Bian, Taiyuan (CN); Haixia Zhang, Taiyuan (CN); Yanchun Zhu, Taiyuan (CN); Yuqin Xue, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/508,637

(22) Filed: Nov. 14, 2023

(65) Prior Publication Data
US 2024/0092038 A1    Mar. 21, 2024

(30) Foreign Application Priority Data
Sep. 20, 2022  (CN) .......................... 202211140392.2

(51) Int. Cl.
*B29C 70/32* (2006.01)
*B29L 31/00* (2006.01)

(52) U.S. Cl.
CPC ......... *B29C 70/32* (2013.01); *B29L 2031/715* (2013.01)

(58) Field of Classification Search
CPC ...................................................... B29C 73/32
See application file for complete search history.

(56) References Cited

U.S. PATENT DOCUMENTS

| 11,795,029 B1 * | 10/2023 | Liang ................... B29C 53/602 |
| 2015/0329315 A1 * | 11/2015 | Hatta ..................... B65H 81/00 |
| | | 242/436 |

FOREIGN PATENT DOCUMENTS

| CN | 113336002 A | * | 9/2021 |
| EP | 3225900 A1 | * | 10/2017 |
| JP | 2014-205305 A | * | 10/2014 |

OTHER PUBLICATIONS

First Office Action and Search Report issued in Chinese Application No. 202211140392.2; dated Oct. 27, 2022; 15 pgs.
(Continued)

Primary Examiner — Jeffry H Aftergut
(74) Attorney, Agent, or Firm — HAUPTMAN HAM, LLP

(57) ABSTRACT

A device for manufacturing a storage container by integrally winding multiple bundles of fibers in a double-layer spiral circumferential direction. The device includes a rotary drive unit and two radial slide drive units provided at two sides of the rotary drive unit, each of the two radial slide drive units is provided with several spiral winding guide wire tubes in a circumferential array and drives the spiral winding guide wire tubes to perform a radial telescopic movement, the rotary drive unit drives the spiral winding guide wire tubes on the two radial slide drive units to perform a rotation movement, the rotary drive unit is connected to the two radial slide drive units by means of brackets, and a rack plate is connected to one side of each of the two radial slide drive units away from the rotary drive unit.

4 Claims, 4 Drawing Sheets

(56) References Cited

OTHER PUBLICATIONS

Notification to Grant Patent Right for Invention issued in Chinese Application No. 202211140392.2; dated Nov. 8, 2022; 3 pgs.

* cited by examiner

DEVICE FOR MANUFACTURING STORAGE CONTAINER BY INTEGRALLY WINDING MULTIPLE BUNDLES OF FIBERS IN DOUBLE-LAYER SPIRAL CIRCUMFERENTIAL DIRECTION

RELATED APPLICATIONS

The present application claims priority from Chinese Application Number 202211140392.2, filed Sep. 20, 2022, the disclosure of which is hereby incorporated by reference herein in its entirety.

TECHNICAL FIELD

The present invention belongs to the technical field of carbon fiber winding devices, and particularly relates to a device for manufacturing a storage container by integrally winding multiple bundles of fibers in a double-layer spiral circumferential direction.

BACKGROUND

Carbon fiber composite materials have advantages such as high specific strength and specific modulus, light weight, and good stiffness and fatigue resistance. In some operation environments with high requirements on high temperature or chemical stability, the carbon fiber composite materials have obvious advantages, are widely used in important fields such as aerospace, automotive, and wind power generation, and relates to various aspects such as military civil use. As a carbon fiber wound product has the characteristics of light weight, high strength, easy automation and processability, there is an increasing required amount of the wound product, and an efficient and convenient winding device must be widely promoted.

In the key technology of hydrogen energy application, the decisive factor is a safe and efficient storage technology. The storage methods mainly comprise a gas storage, a liquid storage and a solid storage. The current winding and forming process method for a storage container is relatively mature and mainly comprises a spiral winding process and a circumferential winding technology.

In terms of performance aspects, such as structural strength and service life, of a storage container, single-bundle winding is a currently main fiber winding forming method for a storage container, and when spiral winding is performed in the method, fibers on the same layer will cause stacking, crossing, and uneven winding, thereby resulting in local stress concentration in the final storage container and failure to maximally exert fiber performance. In terms of the technology of manufacturing costs of a storage container, currently improving production efficiency mainly relies on increasing the number of stations, multi-station synchronous winding requires higher hardware quality, and the number of stations cannot be increased infinitely due to the space limitation of a winding device, the winding efficiency cannot be qualitatively improved, the production efficiency of the storage container cannot be ensured, and the stability of the forming performance is poor.

Currently, domestic high-efficiency and high-precision numerical control fiber winding machines need to be purchased from foreign countries, and there is still a technical problem in the domestic development of multi-filament winding devices. The foreign multi-bundle winding devices comprise generally single-layer spiral winding of multiple bundles, have separation of multi-bundle spiral winding device from an annular winding device, occupy a large space in the ground, and have a winding efficiency that needs to be improved.

SUMMARY

In order to solve at least one of the technical problems existing in the prior art, the present invention provides a device for manufacturing a storage container by integrally winding multiple bundles of fibers in a double-layer spiral circumferential direction.

The present invention is achieved by using the following technical solution: a device for manufacturing a storage container by integrally winding multiple bundles of fibers in a double-layer spiral circumferential direction, including a rotary drive unit and two radial slide drive units provided at two sides of the rotary drive unit, wherein each of the two radial slide drive units is provided with several spiral winding guide wire tubes in a circumferential array and drives the spiral winding guide wire tubes to perform a radial telescopic movement, the rotary drive unit drives the spiral winding guide wire tubes on the two radial slide drive units to perform a rotation movement, the rotary drive unit is connected to the two radial slide drive units by means of brackets, and a rack plate is connected to one side of each of the two radial slide drive units away from the rotary drive unit.

Preferably, each of the two radial slide drive units comprises an end-face Archimedean curved gear, a first rotary support, a radial guide frame, a radial drive assembly and several radial slide assemblies; several curved grooves are provided on a surface of the end-face Archimedean curved gear in a circumferential array, an outer ring of the first rotary support is fixedly connected to the end-face Archimedean curved gear, an inner ring of the first rotary support is fixedly connected to the rack plate on the same side, the radial guide frame is fixedly connected to the bracket on the same side, several guide grooves are provided on the radial guide frame in a circumferential array, a portion of each of the radial slide assemblies slidably extends into each of the guide grooves of the radial guide frame, a protrusion on one side of each of the radial slide assemblies extends into each of the curved grooves of the end-face Archimedean curved gear, and the radial drive assembly is in meshing transmission with an outer gear of the end-face Archimedean curved gear.

Preferably, each of the radial slide assemblies comprises a slide block, a conveying shaft, a bevel gear rotary tube and a slide spline rod, the slide block is slidably provided in the guide groove, and one side of the slide block has a cylindrical protrusion fitted with the curved groove of the end-face Archimedean curved gear, the conveying shaft is mounted within the slide block by means of a bearing, two ends of the conveying shaft protrude out of the slide block, the spiral winding guide wire tubes and the slide spline rod are respectively connected to a front end and a tail end of the conveying shaft, an inner wall of the bevel gear rotary tube is in sliding fit with the slide spline rod, each of the brackets is provided with a collar limiting the sliding of the bevel gear rotary tube along its own axis direction, and bevel gears on the bevel gear rotary tube are provided outside the guide groove.

Preferably, the radial drive assembly comprises a worm and a first servo motor, the worm is horizontally mounted on the rack plate on the same side by means of a bearing frame, an output shaft of the first servo motor is connected to the worm, and the worm is in meshing transmission with the outer gear of the end-face Archimedean curved gear.

Preferably, the rotary drive unit comprises an inner and outer large gear ring, a second rotary support, pinion gear synchronous transmission assemblies, a rotary drive assembly, an annular drive assembly and annular unwinding roller assemblies, an outer ring of the second rotary support is fixedly connected to one side of the inner and outer large gear ring, an inner ring of the second rotary support is fixedly connected to one of the brackets; several groups of pinion gear synchronous transmission assemblies are all distributed and meshed on an outer gear ring of the inner and outer large gear ring, the rotary drive assembly is in meshing transmission with an inner gear ring of the inner and outer large gear ring, each of the pinion synchronous transmission assemblies comprises two small circular gears meshing with the inner and outer large gear ring and two small bevel gears perpendicularly meshing with the bevel gears on the bevel gear rotary tubes on two radial slide units respectively; the two small circular gears are connected in a key manner and are arranged in parallel, and are respectively connected to the small bevel gears on the same side by means of a connection shaft; the connection shaft penetrates through the brackets and is mounted on the brackets by means of bearings; the annular drive assembly and the annular unwinding roller assemblies are mounted on one side of the inner and outer large gear ring away from the second rotary support and are used for achieving the annular winding of the storage container.

Preferably, the annular drive assembly comprises a second servo motor and an annular winding guide wire tube, the second servo motor is mounted on the inner and outer large gear ring by means of a servo motor base, and the annular winding guide wire tube is fixedly sleeved on an output shaft of the second servo motor for adjusting a rotation angle thereof by means of a key connection; the annular unwinding roller assembly comprises a torque motor, an unwinding roller, a guide wire roller, a tension roller and a guide roller, the unwinding roller is used for outputting fiber yarn bundles, the torque motor drives a fiber ball to rotate and output fiber yarn bundles while producing tension, and the fiber yarn bundles pass through the guide wire roller; the tension roller is used for controlling and adjusting the tension of the yarn bundles, and then the guide roller is used for adjusting the output direction; single bundles of fibers output from the guide rollers of multiple annular unwinding roller assemblies are converged into multiple bundles of fibers at the guide roller adjacent to the annular winding guide wire tube, enter the annular winding guide wire tube, and are output from the annular winding guide wire tube.

Preferably, the rotary drive assembly comprises a horizontal motor, a coupling reducer and a drive gear, the horizontal motor is fixed on one of the brackets by means of an annular mounting base, the coupling reducer is mounted on the annular mounting base and is connected to an output shaft of the horizontal motor, an output shaft of the coupling reducer is connected to the drive gear, and the drive gear is in meshing transmission with the inner gear ring of the inner and outer large gear ring.

Preferably, the brackets, the rack plates, the end-face Archimedean curved gear, the first rotary support, the radial guide frame, the inner and outer large gear ring and the second rotary support are coaxially arranged and each has a circular passage for the storage container to pass through, the brackets are anchored on the ground, and a thickness compensation sheet is provided between each of the brackets and the radial guide frame on the same side.

Compared with the prior art, the present invention has the following beneficial effects:

1. The present device provides a device for manufacturing a storage container by integrally winding multiple bundles of fibers in a double-layer spiral circumferential direction, thereby achieving double-layer spiral winding; and the design of integrated spiral winding and annular winding greatly improves the winding efficiency, and provides a new solution for processing a carbon fiber composite wound product.

2. In the present invention, gears designed with the principle of an Archimedean curve at an end face are used to drive spiral winding guide wire tubes on the same radial slide drive unit for synchronous radial feeding; the used gears having the principle of an Archimedean curve drives multiple spiral winding guide wire tubes to move radially, and uses a curve groove to drive in structural characteristics, can improve the precision of the synchronous feeding motion and avoid the problems of low accuracy, large vibration, and poor synchronization caused by gaps due to meshing during the driving of ordinary gears, can make the feeding of multiple spiral winding guide wire tubes more continuous and smooth in terms of control, thereby avoiding tedious procedures such as gear position correction during the synchronous driving of ordinary gears.

3. In the present invention, double-layer spiral winding guide wire tubes are used for feeding, and an inner and outer gear ring drive a pinion gear synchronous transmission assembly distributed in a uniform circumference manner, thereby ensuring that the rotation angles transferred to the spiral winding guide wire tubes are synchronous, and achieving synchronous rotation of the double-layer spiral wound guide wire tube; the double-layer end-face Archimedean curved gear is driven, thereby ensuring that the radial feeding of each layer of spiral winding guide wire tubes does not affect each other.

4. In the present invention, when the inner and outer large gear ring rotates, the outer gear ring controls the double-layer spiral winding guide wire tubes to rotate synchronously by means of bevel gear transmission, and the inner and outer large gear rings at the end face drive an annular drive assembly and an annular unwinding roller assembly to rotate so as to complete the annular winding operation, thereby ensuring that the annular winding guide wire tube rotates while achieving annular winding.

5. In the present invention, by means of the cooperation control of a double-layer radial slide drive unit and a rotary drive unit, the double-layer radial slide drive unit is driven by respective end-face Archimedean curved gears, and can achieving alternative radial feeding and synchronous radial feeding of a double-layer spiral winding guide wire tube, thereby ensuring the movement of single-layer spiral winding guide wire tubes distributed in a uniform circumference manner to be synchronous and achieving the alternative movement of the double-layer spiral winding guide wire tube; by means of theoretical research and structural innovation, the existing winding process of multiple bundles of fibers is broken through, achieving the integration of a spiral winding device and an annular winding device, greatly improving the winding efficiency, reducing the processing costs, improving the winding precision, avoiding fiber crossing and overhead, and thus reducing stress concentration, so that the present invention is a feasible solution for solving the current defect of the winding process.

BRIEF DESCRIPTION OF DRAWINGS

To describe the technical solutions in the embodiments of the present invention or in the prior art more clearly, the accompanying drawings required for the embodiments will be briefly described below. Apparently, the accompanying drawings in the following description show merely some embodiments of the present invention, and a person of ordinary skill in the art may still derive other accompanying drawings from these accompanying drawings without creative efforts.

Figure 1:
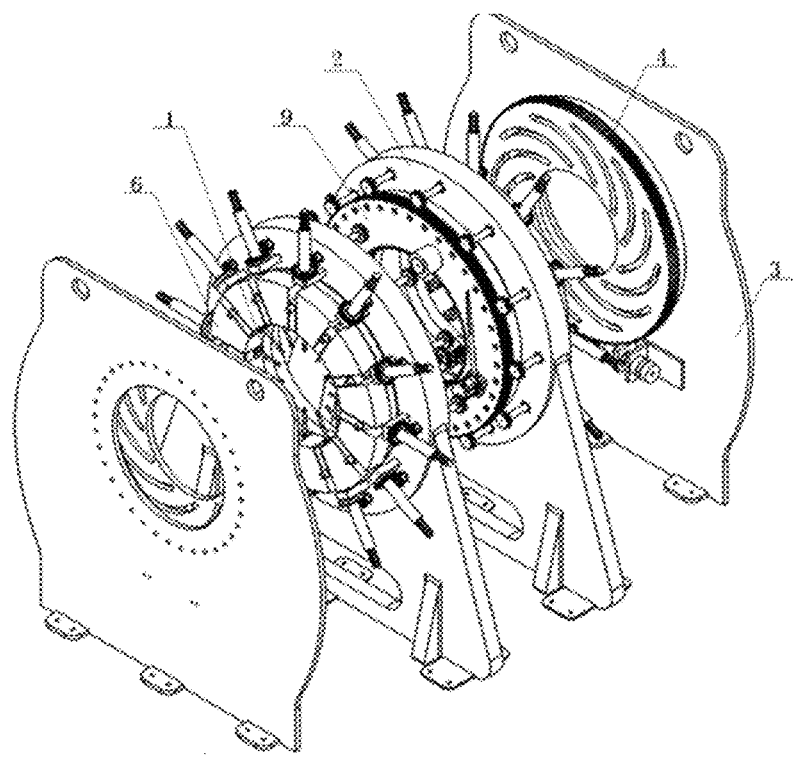
FIG. 1 is a schematic exploded view of the whole structure of the present invention.

In the figures: 1—spiral winding guide wire tube; 2—bracket; 2.1—collar; 3—rack plate; 4—end—face Archimedean curved gear; 4.1—curved grooves; 5—first rotary support; 6—radial guide frame; 6.1—guide groove; 7.1—slide block; 7.2—conveying shaft; 7.3—bevel gear rotary tube; 7.4—slide spline rod; 7.5—end cover; 8.1—worm; 8.2—first servo motor; 8.3—bearing frame; 9—inner and outer large gear ring; 10—second rotary support; 11.1—small circular gear; 11.2—small bevel gear; 11.3—connection shaft; 12.1—horizontal motor; 12.2—coupling reducer; 12.3—drive gear; 12.4—annular mounting base; 13.1—second servo motor; 13.2—annular winding guide wire tube; 13.3—servo motor base; 14.1—torque motor; 14.2—unwinding roller; 14.3—guide wire roller; 14.4—tension roller; 14.5—guide roller; and 15—thickness compensation sheet.

DETAILED DESCRIPTION OF ILLUSTRATIVE EMBODIMENTS

The technical solutions in the embodiments of the present invention are described clearly and completely with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts should fall within the protection scope of the present invention.

It should be noted that the structure, scale, size, etc. shown in the drawings of the specification are only used to cooperatively describe the content disclosed by the specification for those skilled in the art to understand and read, and are not intended to limit the implementation of the present invention. Therefore, it has no technical substantive significance. Any structural modification, change of a scale relationship or adjustment of size should still fall within the scope which can be covered by the technical content disclosed by the present invention without affecting the effects and the objective achieved by the present invention. It should be noted that in this specification, relationship terms such as first and second are only used to distinguish one entity from several other entities, and do not necessarily require or imply the presence of any such actual relationship or sequence between these entities.

The present invention provides an embodiment.

As shown in FIG. 1, a device for manufacturing a storage container by integrally winding multiple bundles of fibers in a double-layer spiral circumferential direction, including a rotary drive unit and two radial slide drive units provided at two sides of the rotary drive unit, wherein each of the two radial slide drive units is provided with several spiral winding guide wire tubes 1 in a circumferential array and drives the spiral winding guide wire tubes 1 to perform a radial telescopic movement, the rotary drive unit drives the spiral winding guide wire tubes 1 on the two radial slide drive units to perform a rotation movement, the rotary drive unit is connected to the two radial slide drive units by means of brackets 2, and a rack plate 3 is connected to one side of each of the two radial slide drive units away from the rotary drive unit. The rotary drive unit and the two radial slide drive units can independently control the action of the spiral winding guide wire tubes 1, and can also simultaneously control the action of the spiral winding guide wire tubes 1; and the three units are independent of each other and do not affect each other.

The brackets 2, the rack plates 3, the end-face Archimedean curved gear 4, the first rotary support 5, the radial guide frame 6, the inner and outer large gear ring 9 and the second rotary support 10 are coaxially arranged and each has a circular passage for the storage container to pass through, the brackets 2 are anchored on the ground, and a thickness compensation sheet 15 is provided between each of the brackets and the radial guide frame 6 on the same side by means of bolts, and the rack plates 3 are anchored on the ground.

Figure 2:
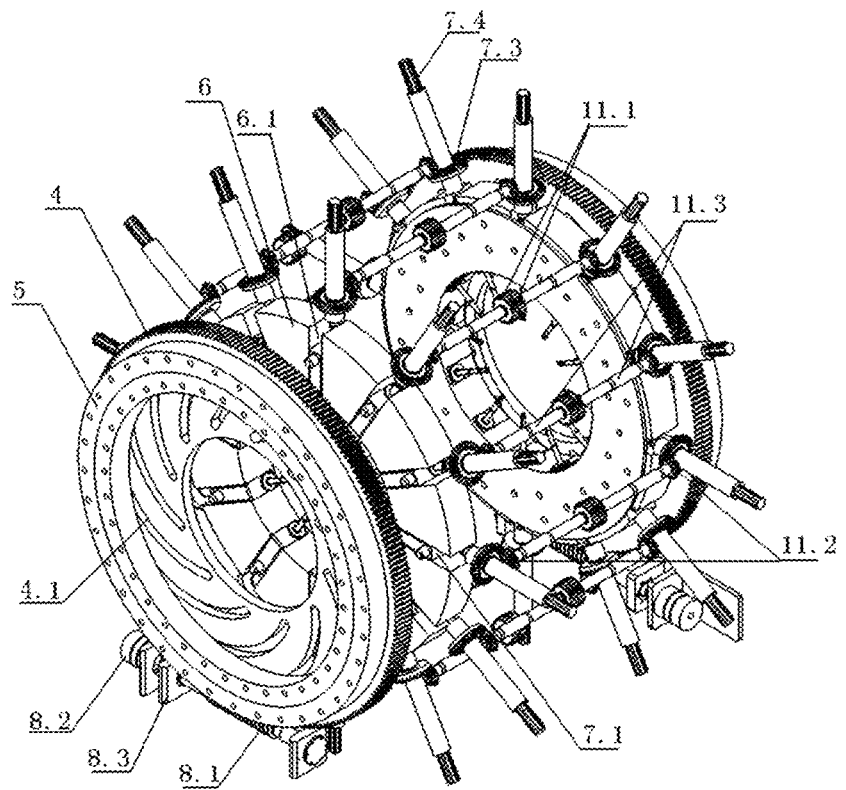
FIG. 2 is a schematic structural view of a radial slide drive unit of the present invention.
Figure 8:
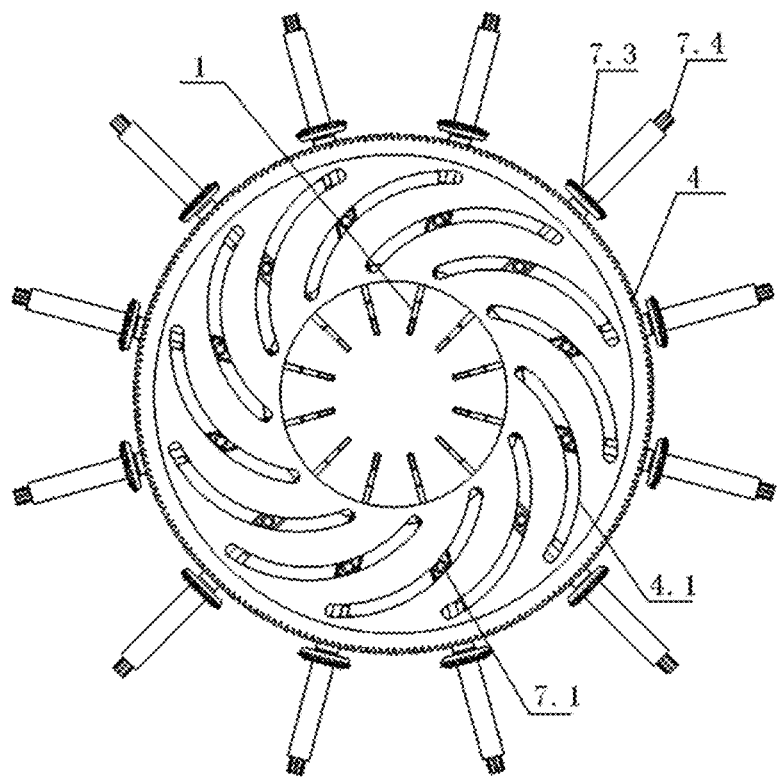
FIG. 8 is a schematic structural view of a drive slide block of an end-face Archimedean curved gear of the present invention.

As shown in FIGS. 2 and 8, each of the two radial slide drive units comprises an end-face Archimedean curved gear 4, a first rotary support 5, a radial guide frame 6, a radial drive assembly and several radial slide assemblies; several curved grooves 4.1 are provided on a surface of the end-face Archimedean curved gear 4 in a circumferential array, an outer ring of the first rotary support 5 is fixedly connected to the end-face Archimedean curved gear 4 by means of bolts, an inner ring of the first rotary support 5 is fixedly connected to the rack plate 3 on the same side by means of bolts, the radial guide frame 6 is fixedly connected to the bracket 2 on the same side, several guide grooves 6.1 are provided on the radial guide frame 6 in a circumferential array, a portion of each of the radial slide assemblies slidably extends into each of the guide grooves 6.1 of the radial guide frame 6, a protrusion on one side of each of the radial slide assemblies extends into each of the curved grooves 4.1 of the end-face Archimedean curved gear 4, the radial drive assembly comprises a worm 8.1 and a first servo motor 8.2, the worm 8.1 is horizontally mounted on the rack plate 3 on the same side by means of a bearing frame 8.3, an output shaft of the first servo motor 8.2 is connected to the worm 8.1, and the worm 8.1 is in meshing transmission with the outer gear of the end-face Archimedean curved gear 4 to provide a drive force for the radial slide drive units.

Figure 6:
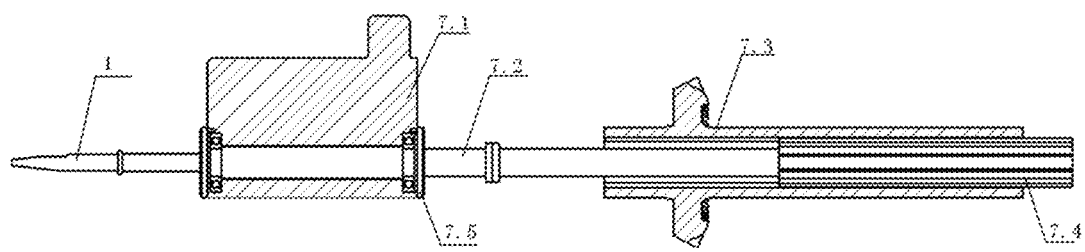
FIG. 6 is a schematic structural view of the internal structure of the radial slide assembly of the present invention.

As shown in FIG. 6, each of the radial slide assemblies comprises a slide block 7.1, a conveying shaft 7.2, a bevel gear rotary tube 7.3 and a slide spline rod 7.4, the slide block 7.1 is slidably provided in the guide groove 6.1, and one side of the slide block has a cylindrical protrusion fitted with the curved groove 4.1 of the end-face Archimedean curved gear 4, so that the end-face Archimedean curved gear 4 drives the slide block 7.1 to move along the guide groove 6.1 of the radial guide frame 6, thereby achieving the radial telescopic movement of the radial winding guide wire tubes 1; the conveying shaft 7.2 is mounted within the slide block 7.1 by means of a bearing, two ends of the conveying shaft protrude out of the slide block 7.1, an end cover 7.5 having a through-hole passes through the conveying shaft 7.2 and is fixed at two ends of the slide block 7.1 by means of bolts, the spiral winding guide wire tubes 1 and the slide spline rod 7.4 are respectively connected to a front end and a tail end of the conveying shaft 7.2, an inner wall of the bevel gear rotary tube 7.3 is in sliding fit with the slide spline rod 7.4, the slide spline rod 7.4 is always inserted into an internal spline groove of the bevel gear rotary tube 7.3 during the radial movement, each of the brackets 3 is provided with a collar 3.1 limiting the sliding of the bevel gear rotary tube 7.3 along its own axis direction, bevel gears on the bevel gear rotary tube 7.3 is provided outside the guide groove 6.1 and the collar 3.1, the conveying shaft 7.2 and the slide spline rod 7.4 are both provided with a passage for yarn bundles to pass through, and the bevel gear rotary tube 7.3 drives the slide spline rod 7.4 to rotate, thereby achieving the rotation of the spiral wound guide wire tube 1.

Figure 3:
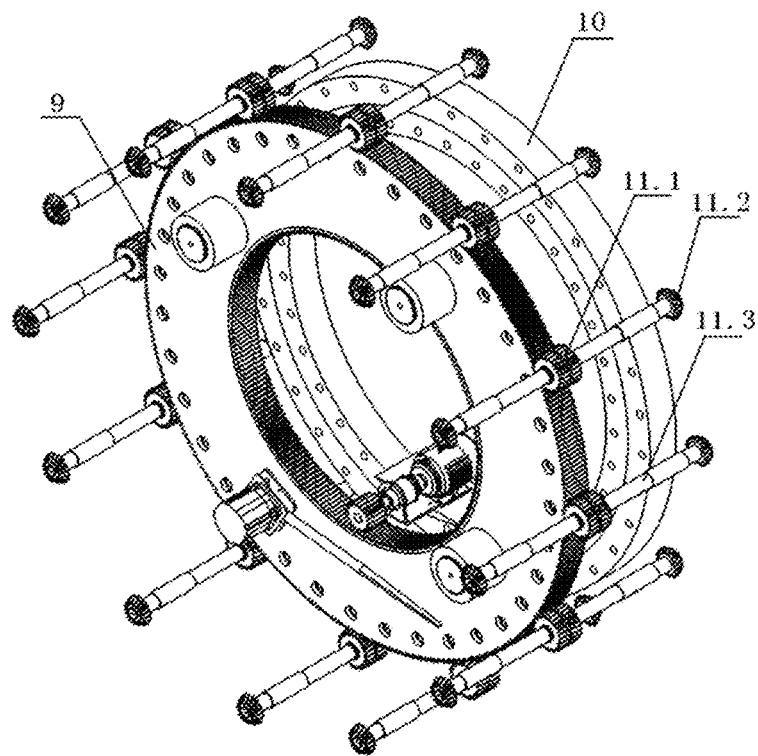
FIG. 3 is a schematic structural view of a rotary drive unit of the present disclosure.
Figure 4:
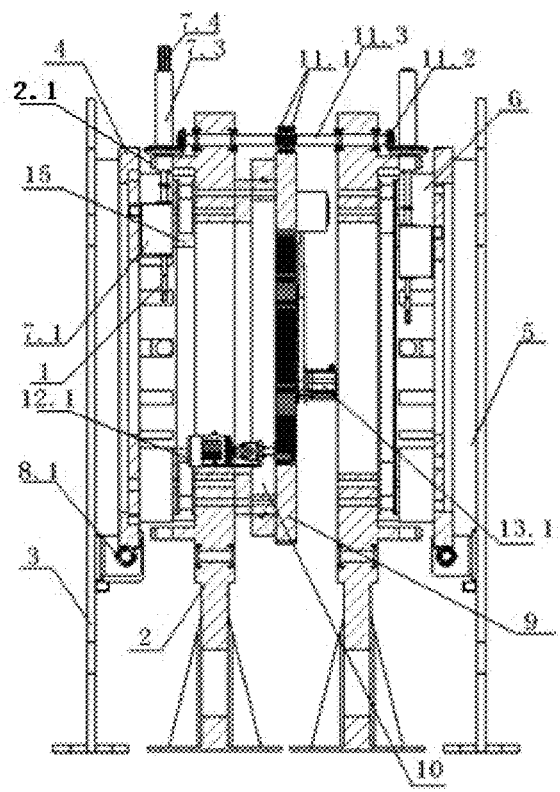
FIG. 4 is a cross-sectional view of the present invention.
Figure 7:
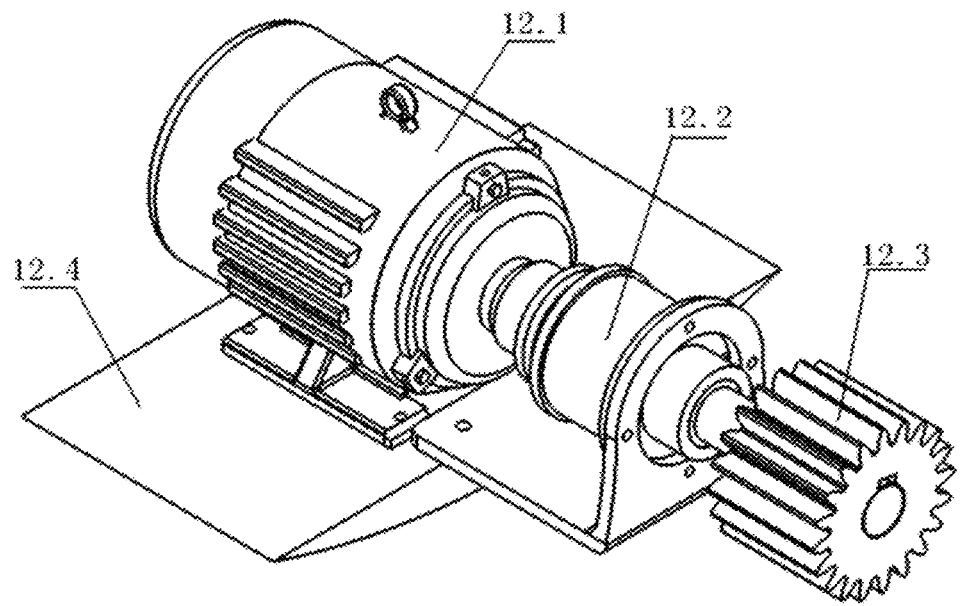
FIG. 7 is a schematic structural view of a rotary drive assembly of the present invention.

As shown in FIGS. 3 and 4, the rotary drive unit comprises an inner and outer large gear ring 9, a second rotary support 10, pinion gear synchronous transmission assemblies, a rotary drive assembly, an annular drive assembly and annular unwinding roller assemblies, an outer ring of the second rotary support 10 is fixedly connected to one side of the inner and outer large gear ring 9, and an inner ring of the second rotary support 10 is fixedly connected to one of the brackets 2. As shown in FIG. 7, the rotary drive assembly comprises a horizontal motor 12.1, a coupling reducer 12.2 and a drive gear 12.3, the horizontal motor 12.1 is fixed at the bottom of an inner ring of one of the brackets 2 by means of an annular mounting base 12.4, the coupling reducer 12.2 is mounted on the annular mounting base 12.4 and is connected to an output shaft of the horizontal motor 12.1, an output shaft of the coupling reducer 12.2 is connected to the drive gear 12.3, and the drive gear 12.3 is in meshing transmission with the inner gear ring of the inner and outer large gear ring 9.

Several groups of pinion gear synchronous transmission assemblies are all distributed and meshed on an outer gear ring of the inner and outer large gear ring 9, each of the pinion synchronous transmission assemblies comprises two small circular gears 11.1 meshing with the inner and outer large gear ring 9 and two small bevel gears 11.2 perpendicularly meshing with the bevel gears on the bevel gear rotary tubes 7.3 on two radial slide units respectively; the two small circular gears 11.1 are connected in a key manner and are arranged in parallel, and are respectively connected to the small bevel gears 11.2 on the same side by means of a connection shaft 11.3; the connection shaft 11.3 penetrates through the brackets 2 and is mounted on the brackets by means of bearings 2.

Figure 5:
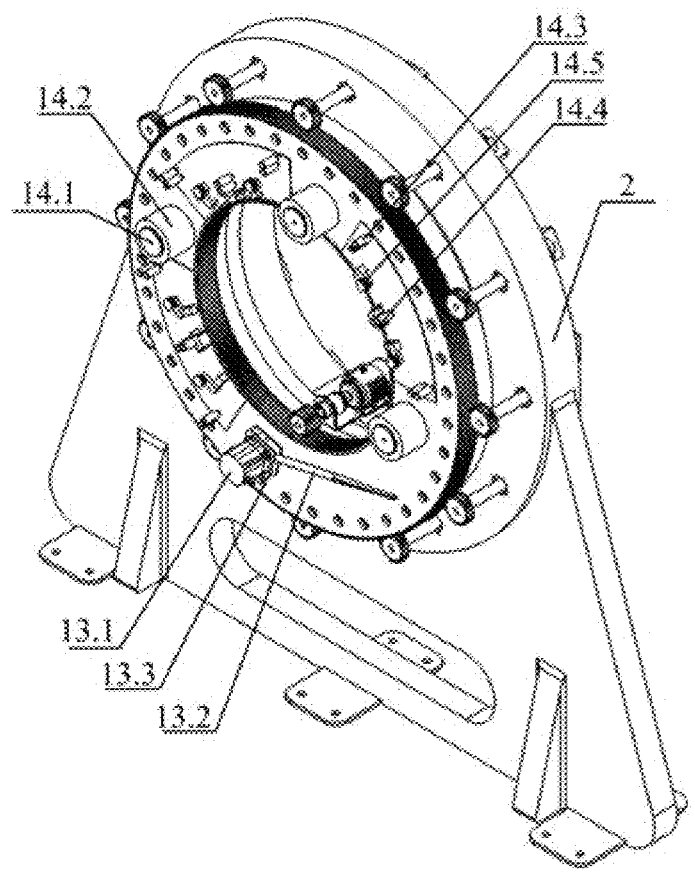
FIG. 5 is an arrangement diagram of an annular drive assembly and an annular unwinding roller assembly of the present invention.

As shown in FIG. 5, the annular drive assembly and the annular unwinding roller assemblies are mounted on one side of the inner and outer large gear ring 9 away from the second rotary support 10 and are used for achieving the annular winding of the storage container; the annular drive assembly comprises a second servo motor 13.1 and an annular winding guide wire tube 13.2, the second servo motor 13.1 is mounted on the inner and outer large gear ring 9 by means of a servo motor base 13.3, and the annular winding guide wire tube 13.2 is fixedly sleeved on an output shaft of the second servo motor 13.1 for adjusting a rotation angle thereof by means of a key connection; the annular unwinding roller assembly comprises a torque motor 14.1, an unwinding roller 14.2, a guide wire roller 14.3, a tension roller 14.4 and a guide roller 14.5, the unwinding roller 14.2 is used for outputting fiber yarn bundles, the torque motor 14.1) drives a fiber ball to rotate and output fiber yarn bundles while producing tension, and the fiber yarn bundles pass through the guide wire roller 14.3; the tension roller 14.4 is used for controlling and adjusting the tension of the yarn bundles, and then the guide roller 14.5 is used for adjusting the output direction; single bundles of fibers output from the guide rollers 14.5 of multiple annular unwinding roller assemblies are converged into multiple bundles of fibers at the guide roller 14.5 adjacent to the annular winding guide wire tube 13.2, enter the annular winding guide wire tube 13.2, and are output from the annular winding guide wire tube 13.2.

Specific Workflow:

During winding, the wound storage container is driven by a feeding device cooperating with the device to perform an axial reciprocating movement and an axial rotation.

A drive gear 12.3 of the rotary drive assembly meshes to drive an inner gear ring of the inner and outer large gear ring 9 to rotate; and an outer gear ring of the inner and outer large gear ring 9 meshes to drive the two small circular gears 11.1 of the pinion synchronous transmission assembly distributed in a uniform circumference manner, and drives the two small bevel gears 11.2 to rotate synchronously; the small bevel gears 11.2 mesh to drive the bevel gears on the bevel gear rotary tubes 7.3 on the same side to rotate; the inner wall of the bevel gear rotary tubes 7.3 is sleeved with a slide spline rod 7.4, and the spiral winding guide wire tubes 1 are driven to rotate by means of the slide spline rod 7.4; a worm 8.1 of the radial drive assembly meshes to drive the end-face Archimedean curved gear 4 to rotate, the curved groove 4.1 of the end-face Archimedean curved gear 4 drives the slide block 7.1 to move radially outwards along the guide groove 6.1 of the radial guide frame 6, the slide block 7.1 drives the conveying shaft 7.2, the conveying shaft 7.2 drives the slide spline rod 7.4 and the spiral winding guide wire tubes 1 to perform a radially protruding movement, and the spiral winding guide wire tubes 1 are driven to move radially to a sealing end section of the storage container at a certain distance.

When winding from the sealing end section of the storage container to the cylindrical body section, the radial slide drive unit on the left side and the rotary drive unit work at the same time, so that the spiral winding guide wire tubes 1 of the radial slide drive unit on the left side retract in the radial direction and move while rotating at the same time, so that the fiber yarn bundles better fit the sealing end section of the storage container at a certain winding angle, thereby avoiding the phenomenon of multiple bundles of fibers crossing; when winding around the cylindrical body section of the storage container, the spiral winding guide wire tubes 1 of the radial slide drive unit on the left side retract radially to a certain position to stop retraction, and continue to wind the cylindrical body section of the storage container with the first layer along the direction of the winding angle.

As one of the situations in spiral winding (when the distance between the two layers of spiral wind guide tubes 1 is the sum of the axial dimensions of the sealing end section and the cylinder body section), after the winding of the cylinder body section is completed, the first layer of winding of the sealing end section and the second layer of winding of the sealing end section start at the same time, and the radial slide drive unit on the left side, the rotary drive unit, and the radial slide drive unit on the right side start working at the same time; the radial drive assembly of the radial slide drive unit on the left side engages and drives the end-face Archimedean curved gear 4 to control the spiral winding guide wire tubes 1 on the left side to perform a radial protruding movement, so as to fit the fiber yarn bundles to a rear sealing end section; at the same time, the radial drive assembly of the radial slide drive unit on the right side engages and drives the end-face Archimedean curved gear 4 to control the spiral winding guide wire tubes 1 on the right side to perform a radial retraction movement, and drives the spiral winding guide wire tubes 1 on the right side to move radially to the sealing port of the storage container at a certain distance; in this process, the rotary drive unit ensures that the spiral winding guide wire tubes 1 of the two radial slide drive units rotate at the same time, so that the fiber yarn bundles simultaneously adhere to the rear sealing end section of the first layer and the front sealing end section of the second layer at the same winding angle.

After the winding of the double-layer sealing end section is completed, the position of the spiral winding guide wire tubes 1 of the radial drive unit on the left side are unchanged, the spiral winding guide wire tubes 1 of the radial drive unit on the right side are radially retracted to a certain position to stop retraction, and the second layer winding is continued on the cylindrical body section of the storage container along the direction of the winding angle.

After the second layer winding of the cylindrical part of the cylindrical body is completed, the second layer winding of the rear sealing end section is continued; the radial slide drive unit on the right side and the rotary drive unit work at the same time; the rotary drive unit controls the spiral winding guide wire tubes 1 to rotate so that the fiber yarn bundles are adhered to the sealing end face; and the radial slide drive unit on the right side controls the spiral winding guide wire tubes 1 on the right side to protrude to the sealing port of the storage container. After the winding of the second layer is completed, the storage container is rotated one cycle, and a second winding is performed in the opposite direction, so that the spiral winding of the two layers can be completed each time, and the following steps are performed in sequence.

Further, after the spiral winding is completed, spiral wound fiber yarn bundles are cut off, and the radial slide drive unit controls the spiral winding guide wire tubes 1 to retract radially to a limit position and then stop; the rotary drive unit continues to operate, the second servo motor 13.1 rotates and drives the tail end of the annular winding guide wire tube 13.2 to protrude to a certain position away from the cylindrical body section, and the position of the tail end of the annular winding guide wire tube 13.2 can be adjusted according to the diameter of the storage container; a unwinding roller 14.2 outputs a fiber yarn bundle, and a torque motor 14.1 drives the rotation of the fiber yarn bundle to output the fiber yarn bundle and generate a tension at the same time, the fiber yarn bundle passes through a guide wire roller 14.3, the tension roller 14.4 is used for controlling and adjusting the tension of the yarn bundles, and then the guide roller 14.5 is used for adjusting the output direction; single bundles of fibers output from the guide rollers 14.5 of multiple annular unwinding roller assemblies are converged into multiple bundles of fibers at the guide roller 14.5 adjacent to the annular winding guide wire tube 13.2, enter the annular winding guide wire tube 13.2, and are output from the annular winding guide wire tube 13.2 and wind along the surface of a member to be wound.

Multiple annular unwinding roller assemblies are circumferentially distributed at one side of an end face of the inner and outer large gear ring 9; during annularly winding, the rotary drive assembly engages and drives the inner and outer large gear ring 9 to continue to rotate, the second servo motor 13.1 adjusts the distance between the tail end of the circumferential winding guide tube 13.2 and the member to be wound, and drives the inner and outer large gear ring 9 to rotate, and cooperate with the feeding of the member to be wound along the central shaft of the device, so as to achieve the annular winding process of the fiber yarn bundle on the cylindrical body section.

The above is only the preferred specific embodiments of the present invention, but the protection scope of the present invention is not limited to this. Any A changes or substitutions that may be easily conceived by those skilled in the art within the technical scope disclosed by the present invention should be covered within the protection scope of the present invention. Therefore, the protection scope of the present invention should be subjected to the protection scope of the claims.

What is claimed is:

1. A device for manufacturing a storage container by integrally winding multiple bundles of fibers in a double-layer spiral circumferential direction, comprising a rotary drive unit and two radial slide drive units provided at two sides of the rotary drive unit, wherein each of the two radial slide drive units is provided with several spiral winding guide wire tubes in a circumferential array and drives the spiral winding guide wire tubes to perform a radial telescopic movement, the rotary drive unit drives the spiral winding guide wire tubes on the two radial slide drive units to perform a rotation movement, the rotary drive unit is connected to the two radial slide drive units by means of brackets, and a rack plate is connected to one side of each of the two radial slide drive units away from the rotary drive unit;

each of the two radial slide drive units comprises an end-face Archimedean curved gear, a first rotary support, a radial guide frame, a radial drive assembly and several radial slide assemblies; several curved grooves are provided on a surface of the end-face Archimedean curved gear in a circumferential array, an outer ring of the first rotary support is fixedly connected to the end-face Archimedean curved gear, an inner ring of the first rotary support is fixedly connected to the rack plate on the same side, the radial guide frame is fixedly connected to the bracket on the same side, several guide grooves are provided on the radial guide frame in a circumferential array, a portion of each of the radial slide assemblies slidably extends into each of the guide grooves of the radial guide frame, a protrusion on one side of each of the radial slide assemblies extends into each of the curved grooves of the end-face Archimedean curved gear, and the radial drive assembly is in meshing transmission with an outer gear of the end-face Archimedean curved gear;

each of the radial slide assemblies comprises a slide block, a conveying shaft, a bevel gear rotary tube and a slide spline rod, the slide block is slidably provided in the guide groove, and one side of the slide block has a cylindrical protrusion fitted with the curved groove of the end-face Archimedean curved gear, the conveying shaft is mounted within the slide block by means of a bearing, two ends of the conveying shaft protrude out of the slide block, the spiral winding guide wire tubes and the slide spline rod are respectively connected to a front end and a tail end of the conveying shaft, an inner wall of the bevel gear rotary tube is in sliding fit with the slide spline rod, each of the brackets is provided with a collar limiting the sliding of the bevel gear rotary tube along its own axis direction, and bevel gears on the bevel gear rotary tube is provided outside the guide groove;

the rotary drive unit comprises an inner and outer large gear ring, a second rotary support, pinion gear synchronous transmission assemblies, a rotary drive assembly, an annular drive assembly and several annular unwinding roller assemblies, an outer ring of the second rotary support is fixedly connected to one side of the inner and outer large gear ring, an inner ring of the second rotary support is fixedly connected to one of the brackets; several groups of pinion gear synchronous transmission assemblies are all distributed and meshed on an outer gear ring of the inner and outer large gear ring, the rotary drive assembly is in meshing transmission with an inner gear ring of the inner and outer large gear ring, each of the pinion synchronous transmission assemblies comprises two small circular gears meshing with the inner and outer large gear ring and two small bevel gears perpendicularly meshing with the bevel gears on the bevel gear rotary tubes on two radial slide units respectively; the two small circular gears are connected in a key manner and are arranged in parallel, and are respectively connected to the small bevel gears on the same side by means of a connection shaft; the connection shaft penetrates through the brackets and is mounted on the brackets by means of bearings; the annular drive assembly and the annular unwinding roller assemblies are mounted on one side of the inner and outer large gear ring away from the second rotary support and are used for achieving the annular winding of the storage container;

the annular drive assembly comprises a second servo motor and an annular winding guide wire tube, the second servo motor is mounted on the inner and outer large gear ring by means of a servo motor base, and the annular winding guide wire tube is fixedly sleeved on an output shaft of the second servo motor for adjusting a rotation angle thereof by means of a key connection; the annular unwinding roller assembly comprises a torque motor, an unwinding roller, a guide wire roller, a tension roller and a guide roller, the unwinding roller is used for outputting fiber yarn bundles, the torque motor drives a fiber ball to rotate and output fiber yarn bundles while producing tension, and the fiber yarn bundles pass through the guide wire roller; the tension roller is used for controlling and adjusting the tension of the yarn bundles, and then the guide roller is used for adjusting the output direction; single bundles of fibers output from the guide rollers of multiple annular unwinding roller assemblies are converged into multiple bundles of fibers at the guide roller adjacent to the annular winding guide wire tube, enter the annular winding guide wire tube, and are output from the annular winding guide wire tube.

2. The device for manufacturing a storage container by integrally winding multiple bundles of fibers in a double-layer spiral circumferential direction according to claim 1, wherein the radial drive assembly comprises a worm and a first servo motor, the worm is horizontally mounted on the rack plate on the same side by means of a bearing frame, an output shaft of the first servo motor is connected to the worm, and the worm is in meshing transmission with the outer gear of the end-face Archimedean curved gear.

3. The device for manufacturing a storage container by integrally winding multiple bundles of fibers in a double-layer spiral circumferential direction according to claim 1, wherein the rotary drive assembly comprises a horizontal motor, a coupling reducer and a drive gear, the horizontal motor is fixed on one of the brackets by means of an annular mounting base, the coupling reducer is mounted on the annular mounting base and is connected to an output shaft of the horizontal motor, an output shaft of the coupling reducer is connected to the drive gear, and the drive gear is in meshing transmission with the inner gear ring of the inner and outer large gear ring.

4. The device for manufacturing a storage container by integrally winding multiple bundles of fibers in a double-layer spiral circumferential direction according to claim 1, wherein the brackets, the rack plates, the end-face Archimedean curved gear, the first rotary support, the radial guide frame, the inner and outer large gear ring and the second rotary support are coaxially arranged and each has a circular passage for the storage container to pass through, the brackets are anchored on the ground, and a thickness compensation sheet is provided between each of the brackets and the radial guide frame on the same side.

* * * * *